United States Patent [19]

Zamudio-Tena et al.

[11] Patent Number: 4,808,418

[45] Date of Patent: Feb. 28, 1989

[54] HETEROGENOUS CHEWING GUM COMPOSITION AND METHOD OF PREPARATION

[75] Inventors: Jose F. Zamudio-Tena, Morristown; Allan H. Graff, Randolph, both of N.J.

[73] Assignee: Warner-Lambert Company, Morris Plains, N.J.

[21] Appl. No.: 68,672

[22] Filed: Jun. 30, 1987

[51] Int. Cl.⁴ ................................................. A23G 3/30
[52] U.S. Cl. ........................................ 426/5; 426/249; 426/804
[58] Field of Search ........................................ 426/3-6, 426/249, 804

[56] References Cited

U.S. PATENT DOCUMENTS

| 1,193,423 | 8/1916 | Pyor | 426/5 |
|---|---|---|---|
| 1,267,320 | 5/1918 | Fries | 426/5 |
| 4,208,431 | 6/1980 | Friello et al. | 426/3 |
| 4,217,368 | 8/1980 | Witzel et al. | 426/5 |
| 4,352,823 | 10/1982 | Cherukuri et al. | 426/5 |
| 4,352,824 | 10/1982 | Puglia et al. | 426/5 |
| 4,352,825 | 10/1982 | Cherukuri et al. | 426/5 |
| 4,399,154 | 8/1983 | Puglia et al. | 426/5 |

Primary Examiner—Jeanette Hunter
Attorney, Agent, or Firm—Henry C. Jeanette; Gary M. Nath

[57] ABSTRACT

A heterogeneous chewing gum compositions having long lasting flavor duration and a marbleized appearance is disclosed. The chewing gum composition comprises a hard gum base, a soft gum base, a flavoring agent, a sweetening agent, and, optionally, other traditional chewing gum additives. Also disclosed is a process for making this heterogeneous chewing gum composition.

24 Claims, No Drawings

HETEROGENOUS CHEWING GUM COMPOSITION AND METHOD OF PREPARATION

FIELD

This invention relates to a hetergeneous chewing gum composition and to a process for producing the same.

BACKGROUND

In formulating chewing gum compositions those skilled in the art have sought to achieve products having a variety of desirable characteristics relating to sweetness, flavor, texture, chew characteristics, etc.

In pending U.S. application Ser. No. 816,949 filed Jan. 6, 1986 a chewing gum is disclosed which achieves flavor impact, quick flavor release, easy bite and sustained flavor release. These properties are achieved by preparing a first chewing gum composition comprising a low gum base content and a second chewing gum composition having a high base content, and combining the two compositions in a non-homogeneous manner, e.g., chewing gum comprising multiple layers. The low base content composition contains liquid flavor and sweetener and, optionally, spray dried flavors. The gum layers are laminated together by conventional methods.

U.S. Pat. No. 1,267,320 issued to Francis Henry Fries on May 21, 1918 discloses an article of confection comprising a central sheet of chewing gum and a layer on each side of the gum sheet, composed of powdered sugar, the whole being rendered integral by pressure.

U.S. Pat. No. 1,193,423 issued to John Donald Pyor on Aug. 1, 1916 discloses a package of chewing gum comprising a supply of neutral gum and an accompanying concentrated flavor stick.

U.S. Pat. No. 4,208,431 to Friello et al on June 17, 1980 discloses a chewing gum composition having a prolonged sweet taste comprising a water-soluble phase and a relatively water-insoluble phase. The water-soluble phase comprises an aqueous softener, a first sweetener in particulate form, and optionally hydrogenated starch hydrolysate dispersed throughout the aqueous softener. The water-insoluble phase is comprised of a plurality of separate and distinct masses suspended in and dispersed throughout the water-soluble phase. Each of these masses comprises gum base, a second sweetener in particulate form, and optionally hydrogenated starch hydrolysate enveloped by the gum base. Also disclosed is a method for forming the above described chewing gum. The method comprises interdispersing in melted gum base particles of a second sweetener and optionally hydrogenated starch hydrolysate to form a continuous phase. The continuous phase is mixed with a first sweetener causing the continuous phase to be torn into discrete masses of gum base enveloping the particles of second sweetener and optional hydrogenated starch hydrolysate. Aqueous softener and optionally hydrogenated starch hydrolysate is mixed with the mixture of discrete masses and first sweetener to form a chewing gum which is smooth and continuous, provided that hydrogenated starch hydrolysate is added at least to the melted gum base or to the discrete masses of gum base and second sweetener.

U.S. Pat. No. 4,217,368 issued to Witzel et al on Aug. 12, 1980 discloses a chewing gum having a prolonged sweet taste consisting essentially of a water-soluble phase and a relatively insoluble phase. The water-soluble phase consists essentially of softener and a first sweetener in particulate form dispersed throughout the softener. The water-insoluble phase consists essentially of a plurality of separate and distinct masses suspended in and dispersed throughout the water-soluble phase. Each of these masses comprisegg um base and particles of a second sweetener enveloped by said gum base. Also disclosed is a method for forming this chewing gum.

U.S. Pat. No. 4,352,823 issued to Cherukuri et al on Oct. 5, 1982 discloses a coextruded chewing gum having a soft gum center portion. The chewing gum comprises an extruded soft gum core portion formed of chewing gum containing at least about 5% to about 10% moisture based on the weight of the core portion, and an outer shell portion formed of chewing gum having a harder consistency than the core portion. The soft core portion comprises a polyisobutylene elastomer or a mixture of medium and lower molecular weight polyisobutylene elastomers.

U.S. Pat. No. 4,352,824 issued to Puglia et al on Oct. 5, 1982 discloses a chewing gum containing gum base and a non-aqueous solid fatty or gelatinous sweetener or flavorant solubilized in the gum base. The chewing gum is laminated with a slab of chewing gum which will supply initial sweetness or flavor impact.

U.S. Pat. No. 4,352,825 issued to Cherukuri et al on Oct. 5, 1982 discloses a coextruded chewing gum having a soft gum center portion comprising an extruded soft gum core portion and an outer shell portion formed of chewing gum and extruded simultaneously with the core portion. The core portion contains a preformed recrystallized sweetener combination including at least two sweeteners which have been recrystallized as a mixture. The outer shell portion has a harder consistency than the core portion.

U.S. Pat. No. 4,399,154 issued to Puglia et al on Aug. 16, 1983 discloses a coextruded chewing gum which includes an extruded center portion surrounded by and bonded to an extruded outer shell portion. The center portion may contain increased amounts of flavor and may have a different density than the outer shell portion to provide a textural difference upon chewing.

Thus, the art has attempted to provide chewing gum compositions having various characteristics relating to texture, flavor perception, chew, etc. by such techniques as coextrusion, lamination, and dispersing particles of sweetener within a gum base which gum base is then dispersed throughout a water-soluble phase. A welcome contribution to art would be a chewing gum composition having long lasting flavor perception, pleasant and subtle texture change characteristics throughout the chewing process until the chewing texture comes into one finally perceived texture, extended shelf life, soft chew characteristics, and, upon the inclusion of a coloring agent in the composition or the use of gum bases having different shades and/or coloration, a unique appearance, produced without the need for having to coextrude or laminate different chewing gum compositions together. Such a contribution is provided by this invention.

SUMMARY OF THE INVENTION

This invention provides a hetergeneous chewing gum composition having long lasting flavor duration and a marbleized appearance comprising:
(A) a hard gum base;
(B) a soft gum base;

(C) a flavoring agent;
(D) a sweetening agent; and
(E) optionally, a bulking agent.

This invention also provides a process for producing a heterogeneous chewing gum composition having long lasting flavor duration and a marbleized appearane, said process comprising: blending a first gum base with a bulking agent and optionally other traditional chewing gum additives to produce a homogeneous mixture, blending a second gum base with said homogeneous mixture to form a heterogeneous mixture, and, optionally, blending other traditional chewing gum additives with said heterogeneous mixture. The first gum base is selected from the group consisting of a hard gum base and a soft gum base. Preferably the first gum base is a hard gum base. The second gum base is the remaining gum base, that is, the gum base not selected as the first gum base. In other words, if the first gum base is a hard gum base than the second gum base is a soft gum base, and if the first gum base is a soft gum base than the second gum base is a hard gum base.

Preferably the gum bases are mixed in alternate fashion with the flavoring agents, sweetening agents and optional additives. Thus, the process of this invention preferably includes the steps of:

(A) melting the first gum base;
(B) blending a bulking agent, a flavoring agent, and, optionally other traditional chewing gum additives with the melted gum base to produce a homogeneous mixture;
(C) melting the second gum base and blending the second gum base with said homogeneous mixture to produce a heterogeneous mixture; and
(D) blending a flavoring agent, optionally a sweetening agent, and optionally other traditional chewing gum additives with said heterogeneous mixture.

The term "marbleized appearance" as used herein describes the appearance the chewing gum composition would have if a coloring agent is included in the composition or gum bases having different shades and/or coloration are utilized.

DETAILED DESCRIPTION OF THE INVENTION

The gum bases utilized, as stated above, are hard gum bases and soft gum bases which are used in amounts effective to form a chewing gum composition. The hardness of the gum base may be determined using an Instron instrument, with a ⅛" probe at a speed of 254 millimeters per minute and a load range of 10 kilogram force. This test reflects the force in kilograms necessary to puncture the gum base of given thickness using the ⅛ probe at the given speed. If Instron Harness Values are determined for the gum bases utilized, the difference between a hard gum base and a soft gum base is reflected by a difference of about 5% in the Instron Hardness Values for the hard gum base and the soft gum base.

In general, the hard gum base and the soft gum base are in a weight ratio (hard gum base:soft gum base) of about 20%:80% to about 80%:20%, with about 25%:75% to about 75%:25% being preferred, and about 30%:70% to about 70%:30% being more preferred. Preferably, the amount (weight %) of soft gum base is equal to or less than the amount of hard gum base.

The amount of gum base employed will vary greatly depending on various factors such as the type of gum bases used, consistency desired and other components used to make the final product. In general, amounts of about 5% to about 60% by weight of the final chewing gum composition (i.e., by weight of the total composition) are acceptable for use in chewing gum compositions with preferred amounts being about 15% to about 40% by weight and most preferred amounts being about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, crown gum, nispero, rosidinha, jelutong, perillo, niger gutta, tunu, balata, gutta-percha, lechi-capsi, sorva, mixtures thereof, and the like. Synthetic elastomers such as butadienestyrene copolymers, polyisobutylenes, isobutyleneisoprene copolymers, polyethylenes, polyvinylacetates, mixtures thereof, and the like are suitable. Preferred polyvinylacetates are low and high molecular weight polyvinylacetates. Generally a low molecular weight polyvinylacetate is one whose molecular weight is less than about 16,000, with about 2,500 to about 16,000 being suitable; a high molecular weight polyvinylacetate is one whose molecular weight is above about 55,000.

Traditional (conventional) chewing gum additives which may optionally be used in effective amounts with the gum bases include flavoring agents, bulking agents, sweetening agents, emulsifiers, fillers, coloring agents, softeners, plasticizers, waxes, elastomer solvents, antioxidants (such as BHA and BHT), and the like.

The bulking agents are used in amounts effective to provide the desired amount of bulk to the gum base. Bulking agents suitable for use include sweetening agents selected from the group consisting of monosaccharides, disaccharides, polysaccharides, sugar alcohols, and mixtures thereof; polydextrose, maltodextrins; minerals such as calcium carbonate, talc, titanium dioxide, dicalcium phosphate, and the like. Bulking agents may be used in amounts up to about 90% by weight of the final gum composition with amounts of about 65% to about 85% being preferred.

The gum base compositions may contain conventional elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood or gum rosin, pentaerythritol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin, and partially hydrogenated methyl ester of rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerin, lecithin, and glyceryl monostearate and the like, may also be incorporated into the gum base to obtain a variety of desirable textures and consistency properties. Waxes, for example, natural waxes, petroleum waxes such as polyurethene waxes, paraffin waxes and microcrystalline waxes may also be incorporated into the gum base to obtain a variety of desirable textures and consistency properties. These traditional ingredients are generally employed in amounts of up to about 30% by weight and preferably in amounts of from about 3% to about 20% by weight of the final gum base composition.

The chewing gum composition may also include the conventional additives such as softeners and plasticizers as discussed above as well as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The chewing gum compositions employing the instant gum bases generally contain sweetening agents (sweeteners). The sweetening agent may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass:

A. Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, acesulfame-K and the like, and the free acid form of saccharin;

C. Dipeptide based sweeteners such as L-aspartyl-L-phenylalanine methyl ester and materials described in U.S. Pat. No. 3,492,131, L-α-aspartyl-N-(2,2,4,4-tetramethyl-3-thietanyl)-D-alaninamide hydrate, and the like;

D. Water-soluble sweeteners derived from naturally occurring water-soluble sweeteners, such as a chlorinated derivative of ordinary sugar (sucrose), known, for example, under the product designation of sucralose; and E. Protein based sweeteners such as thaumatin.

In general, the amount of sweetener will vary with the sweetener selected for a particular chewing gum composition. Thus, for any given sweetener a sufficient amount of sweetener is used to provide the end result desired. For example, an effective amount of sweetener is utilized to provide the level of sweetness desired. This amount will normally be 0.01% to about 90% by weight when using an easily extractable sweetener. The water-soluble sweeteners described in category A above, are usually used in amounts of about 25% to about 75% by weight, and preferably in amounts of about 50% to about 65% by weight of the final chewing gum composition. Some of the sweeteners in category A (e.g., glycyrrhizin) may be used in amounts set forth for categories B–E below due to the sweeteners known sweetening ability. In contrast, the sweeteners described in categories B–E are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

Natural and synthetic flavoring agents well known to the chewing gum art may be added in effective amounts to the chewing gum compositions of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth. These flavoring agents may be used individually or in admixture. Commonly used flavors include mints such as peppermint, menthol, artificial vanilla, cinnamon derivatives, and various fruit flavors, whether employed individually or in admixture.

The amount of flavoring agent employed is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The coloring agents are used in amounts effective to produce the desired color. The coloring agents (colorants) useful in the present invention, include the pigments such as titanium dioxide, which may be incorporated in amounts of up to about 2% by weight, and preferably less than about 1% by weight. Colorants may also include natural food colors and dyes suitable for food, drug and cosmetic applications. These colorants are known as F.D. & C. dyes and lakes. The materials acceptable for the foregoing spectrum of use are preferably water-soluble, and include indigoid dye, known as F.D. & C. Blue No. 2, which is the disodium salt of 5,5-indigotindisulfonic acid. Similarly, the dye known as F.D. & C. Green No. 1 comprises a triphenylmethane dye and is the monosodium salt of 4-[4-N-ethyl-p-sulfobenzylamino)diphenylmethylene]-[1-N-ethyl-N-p-sulfoniumbenzyl)-$\Delta^{2,5}$-cyclohexadienimine].

A full recitation of all F.D. & C. and D. & C. dyes and their corresponding chemical structures may be found in the Kirk-Othmer Encyclopedia of Chemical Technology, at Volume 5, Pages 857–884, which text is accordingly incorporated herein by reference.

Thus, in a process for producing the chewing gum composition of the present invention, a first gum base (preferably hard gum) is heated to a temperature sufficiently high enough to soften the base without adversely effecting the physical and chemical make up of the base. The optimum temperatures utilized may vary depending on the composition of the gum base used, but such temperatures are readily determined by those skilled in the art without undue experimentation. Suitable temperatures are within the range of about 60° to about 90° C. A softener may then be added and mixed with the gum base to obtain a homogeneous pliable mixture. While mixing, the bulking agent is added incrementally to the homogeneous pliable mixture until a homogeneous mass is obtained. Then materials such as a flavoring agent as well as other traditional additives may be added incrementally and mixed until a homogeneous mass is obtained or these materials may be added after the addition of the second gum base (preferably the soft gum base). The second gum base is melted under the same conditions of temperature set forth above for the first melted gum base. The second gum base is added and blended into the homogeneous mass until a heterogeneous mass is obtained. To this heterogeneous mass, there can be added incrementally ingredients such as flavoring agents, sweetening agents and other traditional chewing gum additives, which ingredients are sufficiently blended into the heterogeneous mass. Thereafter, the mixture is formed into suitable chewing gum shapes. The chewing gums of the invention may be in any form known in the art, such as stick gum, slab gum, chunk gum, shredded gum, hard coated gum, tabletted gum, as well as center-filled gum.

Those skilled in the art will appreciate that the total amount of all ingredients (components) used in the chewing gum compositions of this invention equals 100% by weight of the total composition. Also, unless states otherwise, all percents herein are percent by weight of the total composition.

The following examples are illustrative only and should not be construed as limiting the invention in any way. Those skilled in the art will appreciate that variations are possible which are within the spirit and scope of the appended claims.

EXAMPLE 1

Chewing gum compositions were prepared in accordance with the formulations set forth in Table I. In Table I, Compositions A and B represent compositions of this invention, and Composition C is a control composition. The ratio of hard gum base/soft gum base for Composition A was 71%/29% and for Composition B the ratio was 60%/40%.

TABLE I

| Ingredients | Compositions (wt. %) | | |
|---|---|---|---|
| | A | B | C |
| Hard gum base | 17.0 | 14.5 | 20.996 |
| Lecithin | 0.2 | 0.2 | .20 |
| Corn syrup | 15.0 | 15.0 | 16.000 |
| Sweeteners | 28.7 | 28.7 | 53.004 |
| Glycerin | 0.4 | 0.4 | 0.450 |
| Flavor (liquid or powder) | 1.4 | 1.5 | 1.35 |
| Soft gum base | 7.0 | 9.6 | — |
| Flavors (powder) | 1.7 | 1.3 | 2.0 |
| Sweeteners (powder) | 28.6 | 28.8 | — |
| Cerelose | — | — | 6.000 |

Chewing gum compositions A and B of Table I were prepared by melting the hard gum base at a temperature of about 80° to about 90° C. in a separate gum base melter. The melted hard gum base and lecithin were added to a chewing gum kettle mixer and mixed for about 30 seconds to form a pliable mass. The corn syrup was then added to the mass and mixed for about three minutes. Next the sweeteners (sweetening agents) and glycerin were added to the mass and mixed for about 3 minutes. After the sweeteners and glycerin were added and while they were being mixed into the mass the liquid flavors (flavoring agents) were added. Melted soft gum base, melted at about 70° to about 80° C. in a separate gum base melter, was added to the mass while mixing and was mixed for about three minutes. During the mixing of the mass after addition of the soft gum base the powdered flavors and sweeteners are added until the about three minute mixing cycle of the soft gum base is complete. The resulting mass was rolled and scored to shape. By this procedure, heterogeneous chewing gum compositions having long lasting flavor duration and a marbleized appearance were produced.

Chewing gum Composition C (the control) was prepared in a manner similar to the preparation of Compositions A and B with the exception that no soft gum base was used.

EXAMPLE 2

Chewing gum sensorial evaluation was conducted with expert panelists on Compositions A, B and C of Example I. Results were rated on a hedonic scale from 1 to 10 with one being poor flavor, soft texture or low sweetness and ten being good flavor, hard texture or low sweetness. The results are reported in Table II.

TABLE II

| Attributes | Composition | | |
|---|---|---|---|
| | A | B | C |
| Initial Chew | | | |
| Texture of gum | 6.0 | 6.5 | 8.0 |
| Amount of flavor release | 8.5 | 8.0 | 7.0 |
| Amount of sweetness | 8.0 | 7.9 | 7.5 |
| Transitional Chew | | | |
| Texture of gum | 5.0 | 5.5 | 6.0 |
| Amount of flavor | 8.4 | 8.0 | 7.2 |
| Amount of sweetness | 8.5 | 8.0 | 7.6 |
| Final Chew | | | |
| Texture of gum | 6.0 | 5.0 | 7.0 |
| Amount of flavor | 7.5 | 7.3 | 6.9 |
| Amount of sweetness | 7.5 | 7.3 | 6.9 |

The results in Table II demonstrate that the compositions of this invention have good flavor and good sweetness duration and perception, and good chew texture qualities.

EXAMPLE 3

The shelf life and stability of the chewing gum compositions made according to Example I were determined. The tests were conducted by subjecting the chewing gum compositions to the indicated temperature for the indicated amount of time and then evaluating the samples. The results were rated on a hedonic scale from 1 to 10, with one being poor flavor, soft texture, or low sweetness and ten being good flavor, hard texture or high sweetness. The results are reported in Table III.

TABLE III

| Physical Tests Evaluated | Time Interval | Composition | | |
|---|---|---|---|---|
| | | A | B | C |
| Chew and texture (37° C.) | 1 month | 6.0 | 6.5 | 7.0 |
| | 2 months | 6.0 | 6.5 | 7.2 |
| | 3 months | 6.5 | 6.8 | 7.4 |
| | 6 months | 6.5 | 7.0 | 7.5 |
| | 9 months | 7.0 | 7.5 | 8.0 |
| | 12 months | 7.0 | 7.0 | 9.0 |
| Flavor stability (37° C.) | 1 month | 9.1 | 9.0 | 9.0 |
| | 2 months | 8.8 | 8.5 | 8.4 |
| | 3 months | 8.6 | 8.0 | 7.8 |
| | 6 months | 8.5 | 8.0 | 7.6 |
| | 9 months | 8.0 | 7.9 | 7.5 |

TABLE III-continued

| Physical Tests | Time | Composition | | |
|---|---|---|---|---|
| Evaluated | Interval | A | B | C |
| | 12 months | 8.0 | 7.9 | 7.5 |
| Chew and texture | 1 week | 4.5 | 4.8 | 6.8 |
| (25° C.) | 3 months | 4.8 | 4.8 | 6.5 |
| | 6 months | 5.0 | 5.5 | 6.7 |
| | 9 months | 5.8 | 6.5 | 7.5 |
| | 12 months | 6.9 | 6.7 | 8.0 |

The results demonstrate that the compositions of this invention have improved chew characteristics and longer lasting flavor and sweetness. The improved chew characteristics are the pleasant and subtle texture changes throughout the chew in contrast to the drastic texture changes of the conventional, non-inventive chewing gums.

EXAMPLE 4

Instron Hardness tests were conducted on compositions of this invention and on the control made according to Example 1. The compositions tested were subjected to a temperature of about 23° C. and a relative humidity (RH) of about 23% for the time indicated.

TABLE IV

| Hardness/Instron | Weeks | | | | |
|---|---|---|---|---|---|
| 23° C./23% RH | 0 | 2 | 4 | 8 | 12 |
| Composition A | 1.1 | 2.2 | 3.44 | 4.16 | 4.40 |
| Composition B | 1.13 | 2.39 | 3.44 | 4.10 | 4.40 |
| Composition C (control) | 0.83 | 1.75 | 2.81 | 5.11 | 8.39 |

These results demonstrate that the compositions of this invention are significantly more stable than the control after a 12 week aging period.

This invention being thus described, it will be obvious that the same may be varied in many ways. Such variations are not to be regarded as a departure from the spirit and scope of the invention and all such modifications are intended to be included within the scope of the following claims.

What is claimed is:

1. A heterogenous chewing gum composition having long lasting flavor duration and a marbleized appearance comprising:
   a heterogenous mixture comprising;
   a first gum base;
   a second gum base;
   an effective amount of a flavoring agent;
   an effective amount of a sweetener; and
   optionally, an effective amount of a bulking agent;
   wherein said first gum base and said second gum base have a difference in their Instron Hardness Values of about 5%;
   wherein said first gum base and said second gum base are in a weight ratio of about 20%:80% to about 80%:20%; and
   wherein the amount of gum base present is about 5% to about 60% by weight of the final chewing gum composition.

2. The chewing gum composition of claim 1 wherein the chewing gum is a sugar or sugarless containing chewing gum.

3. The chewing gum composition of claim 1 wherein the gum base comprises an elastomer selected from the group consisting of natural rubber, synthetic rubber and mixtures thereof.

4. The chewing gum composition of claim 3 wherein the gum base elastomer is selected from the group consisting of: chicle, crown gum, nispero, rosidinha, jelutong, pendare, perillo, niger gutta, tunu, balata, gutta-percha, lechi-capsi, sorva, butadiene-styrene copolymers, polyisobutylenes, isobutylene-isoprene copolymers, polyethylenes, polyvinylacetates, and mixtures thereof.

5. The chewing gum composition of claim 1 wherein the first gum base and the second gum base are in a weight ratio of about 25%:75% to about 75%:25%, based on the total weight of gum base.

6. The chewing gum composition of claim 1 wherein the sweetening agent is selected from the group consisting of: water-soluble sweetening agents, water-soluble artificial sweetening agents, dipeptide based sweetening agents, water-soluble sweetening agents derived from naturally occurring water-soluble sweetening agents, protein based sweeteners, and mixtures thereof.

7. The chewing gum composition of claim 1 wherein the sweetening agent is present in an amount of about 0.001% to about 90% by weight of the final chewing gum composition.

8. The chewing gum composition of claim 6 wherein said sweetening agent is selected from the group consisting of: xylose, rebose, glucose, mannose, galactose, fructose, sucrose, maltose, invert sugar, partially hydrolyzed starch, corn syrup solids, dihydrochalcones, monellin, steviosides, glycyrrizin, sorbital, xylitol, mannitol, maltitol, hydrogenated starch hydrolysate, saccharin acid, saccharin salts, cyclamate salts, acesulfame-K, L-aspartyl-L-phenylalanine methyl ester, L-α-aspartyl-N-(2,2,4,4-tetramethyl-3-thietanyl)-D-alaninamide hydrate, a chlorinated derivative of sucrose, thaumatin, and mixtures thereof.

9. The composition of claim 1 wherein the flavoring agent is selected from the group consisting of: synthetic flavor oils; flavoring aromatics; oleo resins; extracts derived from plants, leaves, flowers, and fruits; fruit essences; and mixtures thereof.

10. The composition of claim 1 wherein said flavoring agent is present in amounts of about 0.5% to about 3.0% by weight of the final chewing gum composition.

11. The composition of claim 1 wherein there is additionally included traditional chewing gum additives selected from the group consisting of: fillers, coloring agents, softeners, plasticizers, waxes, and mixtures thereof.

12. The chewing gum composition of claim 1 wherein said heterogenous mixture comprises said second gum base heterogenously blended with a homogenous mixture comprising said first gum base, flavoring agent, sweetening agent, and optional bulking agent.

13. The chewing gum composition of claim 12 wherein said heterogenous mixture has additionally blended therewith a flavoring agent, optionally a sweetening agent, and optionally other traditional chewing gum additives.

14. The chewing gum composition of claim 12 wherein said first gum base is the hard gum base and the second gum base is the soft gum base.

15. The chewing gum composition of claim 12 wherein the gum base elastomer is selected from the group consisting of:
   chicle, crown gum, nispero, rosidinha, jelutong, pendare, perillo, niger gutta, tuna, balata, gutta-percha, lenchi-capsi, sorva, butadiene-styrene copolymers, polyisobutylenes, isobutylene-isoprene copolymers, polyethylenes, polyvinyl-acetates, and mixtures thereof;

said sweetening agent is selected from the group consisting of: xylose, rebose, glucose, mannose, galactose, fructose, sucrose, maltose, invert sugar, partially hydrolyzed starch, corn syrup solids, dihydrochalcones, monellin, steviosides, glycyrrizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-alpha-aspartyl-N-(2, 2, 4, 4-tetramethyl-3-thietanyl)-D-alaninamide hydrate, a chlorinated derivative of sucrose, thaumatin, and mixtures thereof; and said flavoring agent is selected from the group consisting of: synthetic flavor oils; flavoring aromatics; oleo resins; extracts derived from plants, leaves, flowers, and fruits; fruit essences; and mixtures thereof.

16. A process for producing a heterogenous chewing gum composition having long lasting flavor duration and a marbleized appearance, said process comprising:

blending a first gum base with an effective amount of a bulking agent and optionally effective amounts of other traditional chewing gum additives to produce a homogenous mixture;

blending a second gum base with said homogenous mixture to form a heterogenous mixture; and optionally, blending effective amounts of other traditional chewing gum additives with said heterogenous mixture;

wherein said first gum base and said second gum base have a difference in their Instron Hardness Values of about 5%;

wherein said first gum base and said second gum base are present in a weight ratio of about 20%:80% to about 80:20%; and wherein the amount of gum base present is about 5% to about 60% by weight of the final chewing gum composition.

17. The process of claim 16 wherein there is included the steps of (A) melting the first gum base;

(B) blending a bulking agent, a flavoring agent and, optionally, other traditional chewing gum additives with the melted gum base to produce a homogeneous mixture;

(C) melting the second gum base and blending the second gum base with said homogeneous mixture to produce a heterogeneous mixture; and (D) blending a flavoring agent, optionally a sweetening agent, and optionally other traditional chewing gum additives with said heterogeneous mixture.

18. The process of claim 17 wherein the first melted gum base is the hard gum base, and the second melted gum base is the soft gum base.

19. The process of claim 17 wherein the hard gum base and the soft gum base are in a weight ratio of abut 25%:75% to about 75%:25%, based on the total weight of gum base.

20. The process of claim 16 wherein the gum base comprises an elastomer selected from the group consisting of natural rubber, synthetic rubber and mixtures thereof.

21. The process of claim 16 wherein the gum base elastomer is selected from the group consisting of: chicle, crown gum, nispero, rosidinha, jelutong, pendare, perillo, niger gutta, tunu, balata, gutta-percha, lechicapsi, sorva, butadiene-styrene copolymers, polyisobutylenes, isobutylene-isoprene copolymers, polyethylenes, polyvinylacetates, and mixtures thereof.

22. The process of claim 16 wherein said bulking agent is a sweetening agent selected from the group consisting of monosaccharides, disaccharides, polysaccharides, sugar alcohols, and mixtures thereof.

23. The process of claim 17 wherein the sweetening agent is selected from the group consisting of: water-soluble sweetening agents, water-soluble artificial sweetening agents, dipeptide based sweetening agents, water-soluble sweetening agents derived from naturally occurring water-soluble sweetening agents, protein based sweeteners, and mixtures thereof.

24. The process of claim 17 wherein the flavoring agent is selected from the group consisting of: synthetic flavor oils; flavoring aromatics; oleo resins; extracts derived from plants, leaves, flowers, and fruits; fruit essences; and mixtures thereof.

* * * * *